United States Patent
Oami et al.

(10) Patent No.: US 8,873,799 B2
(45) Date of Patent: *Oct. 28, 2014

(54) MATCHING WEIGHT INFORMATION EXTRACTION DEVICE

(75) Inventors: Ryoma Oami, Tokyo (JP); Kota Iwamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 581 days.

This patent is subject to a terminal disclaimer.

(21) Appl. No.: 13/144,131

(22) PCT Filed: Jan. 20, 2010

(86) PCT No.: PCT/JP2010/000277
§ 371 (c)(1),
(2), (4) Date: Jul. 12, 2011

(87) PCT Pub. No.: WO2010/084738
PCT Pub. Date: Jul. 29, 2010

(65) Prior Publication Data
US 2011/0274317 A1    Nov. 10, 2011

(30) Foreign Application Priority Data
Jan. 23, 2009   (JP) ................... 2009-012814

(51) Int. Cl.
*G06K 9/00* (2006.01)
*H04N 5/14* (2006.01)
*G06F 17/30* (2006.01)

(52) U.S. Cl.
CPC .......... *G06F 17/30256* (2013.01); *H04N 5/144* (2013.01); *G06F 17/30781* (2013.01)
USPC ........................................... 382/103

(58) Field of Classification Search
USPC .......................... 382/305, 218, 220, 190–195
See application file for complete search history.

(56) References Cited

U.S. PATENT DOCUMENTS

| | | | |
|---|---|---|---|
| 6,792,043 B1 | 9/2004 | Takahashi et al. | |
| 6,973,257 B1 * | 12/2005 | Park et al. | 386/241 |
| 8,130,274 B2 * | 3/2012 | Okamoto et al. | 348/180 |
| 8,335,251 B2 * | 12/2012 | Oami et al. | 375/240.08 |

(Continued)

FOREIGN PATENT DOCUMENTS

| | | | | |
|---|---|---|---|---|
| CN | 101036399 A | | 9/2007 | |
| JP | 2000-194727 | * | 7/2000 | G06F 17/30 |

(Continued)

OTHER PUBLICATIONS

Office Action, dated Mar. 26, 2013, issued by the Korean Intellectual Property Office in counterpart Korean Patent Application No. 10-2011-7017336.

(Continued)

*Primary Examiner* — Ishrat I Sherali
(74) *Attorney, Agent, or Firm* — Sughrue Mion, PLLC

(57) ABSTRACT

The matching weight information extraction device includes a matching weight information extraction unit. The matching weight information extraction unit analyzes a change in a time direction of at least either an input video or features of a plurality of dimensions extracted from the video, in association with the dimensions. Further, the matching weight information extraction unit calculates weight information to be used for matching for each of the dimensions as matching weight information, according to a degree of the change in the time direction.

31 Claims, 12 Drawing Sheets

(56) References Cited

U.S. PATENT DOCUMENTS

| | | | |
|---|---|---|---|
| 8,417,037 B2* | 4/2013 | Bronstein et al. | 382/190 |
| 2002/0044693 A1 | 4/2002 | Ogawa | |
| 2002/0106127 A1* | 8/2002 | Kodama et al. | 382/195 |
| 2008/0033898 A1 | 2/2008 | Hashimoto | |

FOREIGN PATENT DOCUMENTS

| | | | | |
|---|---|---|---|---|
| JP | 2000-194727 A | | 7/2000 | |
| JP | 2006-054802 | * | 2/2006 | H04N 7/32 |
| JP | 2006-054802 A | | 2/2006 | |
| JP | 2006-285570 A | | 10/2006 | |
| JP | 2008-040682 A | | 2/2008 | |

OTHER PUBLICATIONS

Extended European Search Report issued May 8, 2012 in corresponding European Application No. 10733346.0.

Zhao et al, "Real-time feature-aware video abstraction", The Visual Computer, International Journal of Computer Graphics, May 29, 2008, vol. 24, No. 7-9, pp. 727-734.

Kasutani et al, "An Adaptive Feature Comparison Method for Real-Time Video Identification", ,Proceedings of the International Conference on Image Processing, Sep. 14-17, 2003, vol. 2, pp. 5-8.

Kota Iwamoto, et al., "Image Signature Robust to Caption Superimposition for Video Sequence Identification", Proceedings of International Conference on Image Processing (ICIP2006), 2006, pp. 3185-3188.

Eiji Kasutani, et al., "Video Material Archive System for Efficient Video Editing Based on Media Identification", Proceedings of International Conference on Multimedia and Expo (ICME2004), 2004, pp. 727-730.

Communication dated Apr. 10, 2014 from the State Intellectual Property Office of The People's Republic of China in counterpart Chinese Application No. 201080005086.7.

* cited by examiner

MATCHING WEIGHT INFORMATION EXTRACTION DEVICE

CROSS REFERENCE TO RELATED APPLICATIONS

This application is a National Stage of International Application No. PCT/JP2010/000277 filed Jan. 20, 2010, claiming priority based on Japan Patent Application No. 2009-012814 filed Jan. 23, 2009, the contents of all of which are incorporated herein by reference in their entirety.

TECHNICAL FIELD

The present invention relates to video signature extraction devices, video signature extraction methods, and video signature extraction programs, for retrieving videos, which are capable of detecting similar or identical moving image segments among a plurality of moving images.

BACKGROUND ART

An example of moving image feature extraction and matching device, using weight information, is described in Non-Patent Document 1. FIG. 12 is a block diagram showing a moving image feature extraction device described in Non-Patent Document 1.

A block unit feature extraction unit 1000 extracts a feature for each block from a first video to be input, and outputs a first feature to a matching unit 1030. Another block unit feature extraction unit 1010 extracts a feature for each block from a second video to be input, and outputs a second feature to the matching unit 1030. A weighting coefficient calculation unit 1020 calculates a weighting value of each of the blocks based on a learning video to be input, and outputs a weighting coefficient to the matching unit 1030. The matching unit 1030 compares the first feature output from the block unit feature extraction unit 1000 with the second feature output from the block unit feature extraction unit 1010 using the weighting coefficient output from the weighting coefficient calculation unit 1020, and outputs a matching result.

Next, operation of the device shown in FIG. 12 will be described.

The block unit feature extraction unit 1000 divides each of the frames of the input first video into blocks, and calculates a feature for identifying the video from each block. Specifically, the block unit feature extraction unit 1000 determines the type of the edge for each block, and calculates the type as a feature of each block. Then, for each of the frames, the block unit feature extraction unit 1000 forms a feature vector configured of the edge types of the respective blocks. Then, the block unit feature extraction unit 1000 calculates the feature vector of each of the frames, and outputs the acquired feature to the matching unit 1030 as the first feature.

Operation of the block unit feature extraction unit 1010 is similar to that of the block unit feature extraction unit 1000. The block unit feature extraction unit 1010 calculates the second feature from the input second video, and outputs the acquired second feature to the matching unit 1030.

On the other hand, the weighting coefficient calculation unit 1020 calculates probability that a caption is inserted in each block of a frame beforehand, using a learning video. Then, based on the calculated probability, the weighting coefficient calculation unit 1020 calculates a weighting coefficient of each block. Specifically, a weighting coefficient is calculated such that weighting becomes high as the probability of a caption being superimposed is low, in order to improve robustness to caption superimposition. The acquired weighting coefficient is output to the matching unit 1030.

The matching unit 1030 compares the first feature output from the block unit feature extraction unit 1000 with the second feature output from the block unit feature extraction unit 1010, using the weighting coefficient output from the weighting coefficient calculation unit 1020. Specifically, the matching unit 1030 compares the features of the blocks at the same position in the two frames, and calculates a score of the block unit such that the score is 1 if they are the same, and the score is 0 if they are not the same. The matching unit 1030 sums the acquired scores of the block units by weighting them with use of the weighting coefficients, and calculates a matching score (similarity value of a frame unit) of the frame. The matching unit 1030 performs these processes on the respective frames to thereby acquire a matching result between the first video and the second video.

Through these processes, it is possible to perform matching of moving images while reducing an influence of caption superimposition in portions where the influence may be large, and to achieve high matching accuracy even with caption superimposition.

Patent Document 1 describes a device for retrieving moving images, using features of images such as average values in block units or DCT coefficients and motion vector information obtained between previous and next frames. In the moving image retrieval device of Patent Document 1, first, at least one of values of physical moving image feature information including luminance, color difference information, and color information of each frame, an average value thereof, the sum of the values, or a difference value thereof, is extracted from the input image with respect to each frame. Then, the extracted values are aligned on a time axis, and all values in the alignment or values extracted from the alignment in certain intervals or irregular intervals are extracted as moving image feature information. It is also possible to extract a DCT coefficient and motion compensation information of a frame from compressed moving image data, and obtain an average value of DCT coefficients, a sum value thereof, or a difference value of the values, and from the motion compensation information, obtain at least one of a motion vector, an average motion vector between previous and next frames, a sum motion vector, a difference vector, a motion vector of the frame as a whole, and the like. Then, the obtained values are aligned on a time axis, and all values in the alignment or values extracted from the alignment in certain intervals or irregular intervals are extracted as moving image identification information.

Patent Document 1: Japanese Unexamined Patent Publication No. 2000-194727

Non-Patent Document 1: Kota Iwamoto, Eiji Kasutani, Akio Yamada, "Image Signature Robust to Caption Superimposition for Video Sequence Identification", Proceedings of International Conference on Image Processing (ICIP2006), 2006

Non-Patent Document 2: Eiji Kasutani, Ryoma Oami, Akio Yamada, Takami Sato, and Kyoji Hirata, "Video Material Archive System for Efficient Video Editing Based on Media Identification", Proceedings of International Conference on Multimedia and Expo (ICME2004), pp. 727-730, 2004

SUMMARY

A problem involved in the above art is that it is difficult to improve the discrimination accuracy in a time direction in scenes having less temporal change. In the case of Non-Patent Document 1, as the weighting at the time of matching is determined by the probability of caption superimposition, control is not focused on matching of scenes having less temporal changes. In scenes having less temporal change, it is often the case where the screen image seldom moves, and changes in the image such as motion and brightness changes are caused only in a local region. In that case, by performing matching while focusing on such a local region, it is possible to improve the discrimination accuracy even when encoding distortion or the like is applied. In the above-described method, however, a weighting coefficient is not determined from such a viewpoint. Accordingly, matching is subjected to encoding distortion or the like in regions of no motion which covers almost entire screen image, so that discrimination accuracy in a time direction is lowered. Even in Patent Document 1, although motion information is used, a feature obtained from motion information and a feature obtained from luminance or a DCT coefficient are used independently and matching is not performed while focusing on local regions. As such, Patent Document 1 also involves a similar problem.

OBJECT OF THE INVENTION

An object of the present invention is to provide a matching weight information extraction device capable of solving a problem of low discrimination capability of video signatures generated from moving images having less temporal changes.

A matching weight information extraction device, according to an aspect of the present invention, includes a matching weight information extraction unit which analyzes a change in a time direction of at least either an input video or features of a plurality of dimensions extracted from the video, in association with the dimensions, and calculates weight information to be used for matching for each of the dimensions as matching weight information, according to a degree of the change in the time direction.

As the present invention is configured as described above, the present invention is able to achieve an advantageous effect of improving the discrimination accuracy in a time direction even in scenes having less temporal changes.

EXEMPLARY OF EMBODIMENTS

Next, best modes for carrying out the invention will be described in detail with reference to the drawings.

Figure 1:
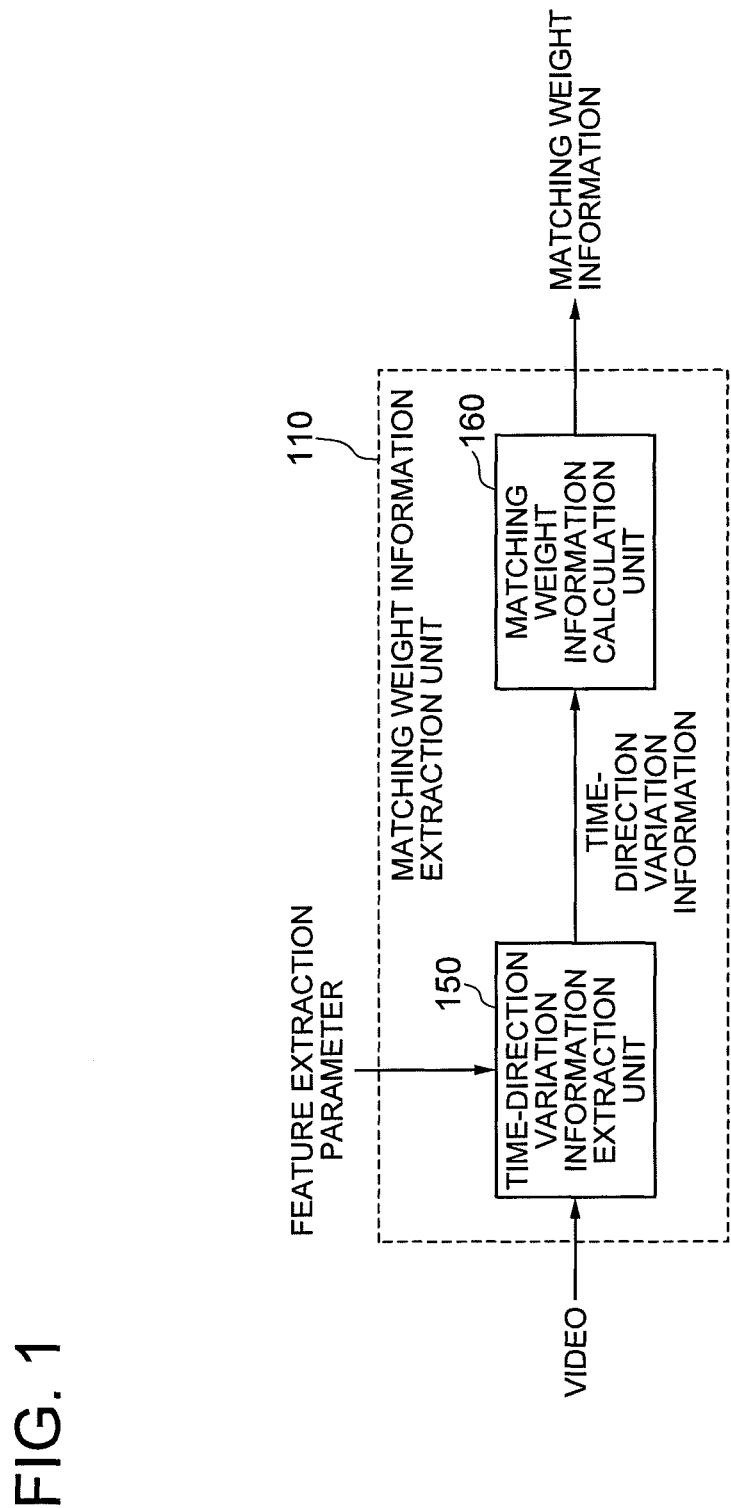
FIG. 1 is a block diagram showing a first embodiment of a matching weight information extraction device according to the present invention.

Referring to FIG. 1 showing a matching weight information extraction device of a first embodiment of the present invention, the matching weight information extraction device includes a matching weight information extraction unit 110. The matching weight information extraction unit 110 includes a time-direction variation information extraction unit 150 and a matching weight information calculation unit 160.

The time-direction variation information extraction unit 150 extracts time-direction variation information from an input video based on feature extraction parameters, and outputs it to the matching weight information calculation unit 160. The matching weight information calculation unit 160 calculates matching weight information for matching from the time-direction variation information output from the time-direction variation information extraction unit 150, and outputs it.

It should be noted that the matching weight information extraction device can be realized by a computer in the following manner, for example. A disk, a semiconductor memory, or another recording medium storing a program for allowing a computer to function as the matching weight information extraction device is prepared, and the computer is caused to read the program. The computer controls the self operation in accordance with the read program to thereby realize the time-direction variation information extraction unit 150 and the matching weight information calculation unit 160 on the self computer.

Next, operation of the matching weight information extraction device shown in FIG. 1 will be described.

First, if a unit of constructing a screen image of a video such as a frame or a filed is called a picture, a visual feature to be handled in the present invention is a feature vector having a plurality of dimensions calculated for each picture. This means that a picture is regarded as one still image, and physical quantities indicating the features thereof such as colors, patterns, and shapes are used as visual features. Further, the visual features are not obtained by converting the entire screen but are calculated from sub-regions in the screen. This means that each dimension of the feature vector is associated with a particular region within the screen by a feature extraction parameter, and the value of the feature extracted from the region is stored. For example, each dimension of the feature vector has a feature extracted from each of the blocks formed by dividing the screen into blocks. It is also possible to obtain a value of a feature of each dimension from a predetermined region in any shape. It should be noted that if each dimension of the feature vector has a feature extracted from a particular block within the screen, a feature extraction parameter is specifically information describing the specific block for extracting the feature (coordinate value of the block, index number of the block, or the like). If local regions in various shapes correspond to respective dimensions of a feature vector, information describing such a local region (position, size, and shape of the local region) serves as a feature extraction parameter.

In FIG. 1, a video is input to the time-direction variation information extraction unit 150. The time-direction variation information extraction unit 150 calculates an amount of change of the image in a time direction in the region associated with each dimension of the feature by a feature extraction parameter. The amount of change is calculated for each region using a current target picture and the pictures before and after thereof. A specific method for calculating the amount of change by the time-direction variation information extraction unit 150 will be described below. The calculated information describing the amount of change in the image is output to the matching weight information calculation unit 160 as time-direction variation information.

The matching weight information calculation unit 160 calculates matching weight information based on the time-direction variation information input from the time-direction variation information extraction unit 150. This means that according to the amount of change in a time direction calculated with respect to each dimension, information describing the degree of weighting for each dimension of the feature to be used for matching is determined and output. As a region having a larger change in a time direction has a higher possibility of contributing to discrimination of a video, weighting is performed such that a larger change is determined to be more important. For example, a degree of weighting may be determined by a function which monotonically increases with respect to an amount of change in a time direction. Matching weight information may be a coefficient itself which determines the degree of weighting, or may be information of index designating a class among classes formed by dividing the degrees of weighting from low to high. In a scene that an anchor person speaks in a news program, for example, there is a case where no motion is found in areas other than an area around the face of the anchor person. In that case, as a change in a time direction in the dimension of the region corresponding to the face of the anchor person becomes relatively larger than the changes in other regions in the screen image, matching weight information is calculated such that weight of the dimension of the feature corresponding to the face region (particularly, a region corresponding to the mouth and eyes) is high.

It should be noted that the matching weight information may be calculated for each picture, or calculated for several pictures in a lump, and output. For example, if a portion with motion within a shot is limited to a particular region, it is possible to calculate and output matching weight information with respect to the entire shot. More specifically, it is possible that matching weight information, obtained for one picture within a shot, is also used for other pictures in the shot. Thereby, the amount of calculation for obtaining the matching weight information can be reduced. It is also possible to calculate matching weight information for all or a plurality of pictures within a shot and, with use of a representative value thereof (average, median, etc.), describe matching weight of the entire shot, and use it for all pictures in the shot. Thereby, the amount of information of the matching weight information can be reduced.

However, units for outputting matching weight information are not limited to shots, and may be fixed time intervals such as every several pictures. It is also possible to calculate time segments, to which the same matching weight information is applicable, from time direction variation information, and calculate and output matching weight information in a lump with respect to the pictures included in the time segments. In that case, as the number of pictures put together varies each time, the number of pictures is also described together. Time segments to which the same matching weight information is applicable are able to be calculated by applying threshold processing on changes in the time direction variation information between pictures. As such, time direction variation information in the head picture in a time segment and time direction variation information of the current picture are compared, and if the degree of change exceeds a threshold, a segment up to the previous picture is considered as one unit, whereby matching weight information with respect to such segment is calculated. The matching weight information with respect to such segment may be used as matching weight information of an arbitrary picture in the segment or a representative value of matching weight information of the pictures in the segment. Through these processes, regardless of a processing target video, the amount of information of the matching weight information can be reduced while keeping high discrimination accuracy in a time direction.

Further, if a plurality of dimensions in a feature vector correspond to the same region, they may be shown in a lump as one weight information. For example, in the case of Edge Histogram set in ISO/IEC 15938-3, every five bins correspond to the same region. In that case, weight information may be described in a lump every five bins.

Next, an exemplary configuration of the time-direction variation information extraction unit 150 will be described with reference to FIG. 2.

Figure 2:
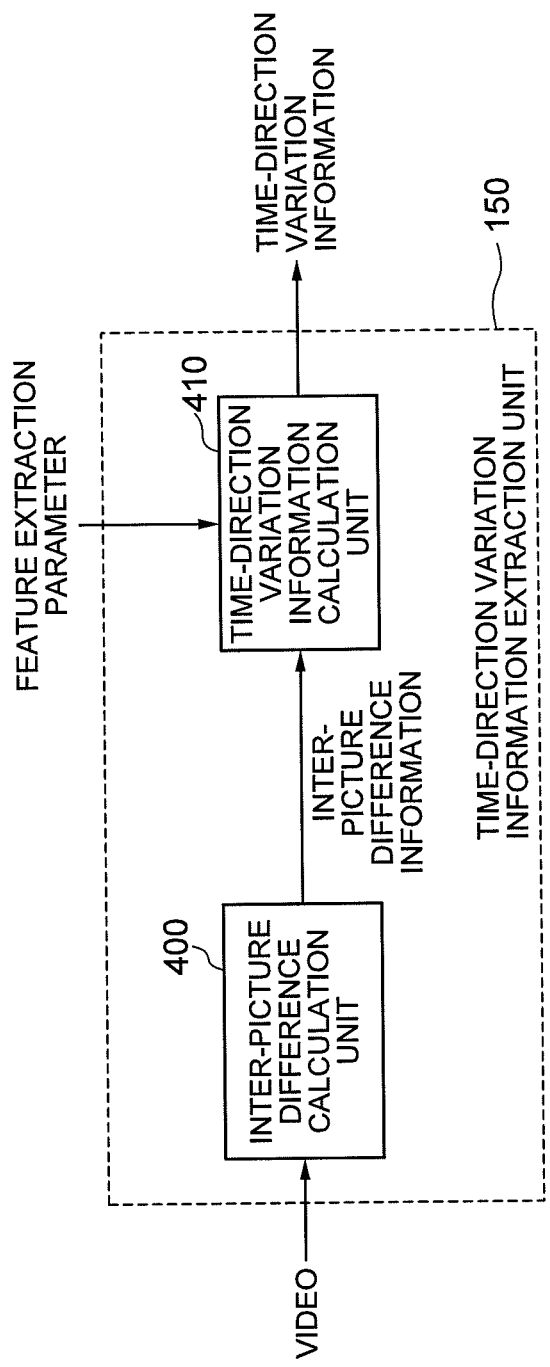
FIG. 2 is a block diagram showing an exemplary configuration of a time-direction variation information extraction unit 150.

Referring to FIG. 2 showing an exemplary configuration of the time-direction variation information extraction unit 150, the time-direction variation information extraction unit 150 includes an inter-picture difference calculation unit 400 and a time-direction variation information calculation unit 410.

The inter-picture difference calculation unit 400 calculates inter-picture difference information from the input video, and outputs it to the time-direction variation information calculation unit 410. The time-direction variation information calculation unit 410 calculates time-direction variation information using the inter-picture difference information output from the inter-picture difference calculation unit 400 and a feature extraction parameter, and outputs it.

Next, operation of the time-direction variation information extraction unit 150 shown in FIG. 2 will be described.

First, a video is input to the inter-picture difference calculation unit 400. The inter-picture difference calculation unit 400 calculates a difference in pixel value between pictures. Calculation of a difference may be performed for each pixel or performed for a region for which calculation for some pixels can be made at once (for example, a block). For example, a method in which a representative value (average, median, etc.) with respect to each region is first obtained, and then, a difference with a representative value of a region at the same position is obtained between pictures, may be used. By this method, it is possible to reduce an influence of noise superimposed on the video. Further, a difference between pixel values may be a difference between luminance values. It is also possible to use color components of R, G, and B as pixel values, and calculate a difference of at least one of them to use as a difference of the pixel value. Of course, a color space may be any color space such as HSV or L*a*b*, rather than RGB. Further, as a difference, it is possible to obtain an absolute value of a difference by performing absolute value computation, rather than simply subtracting a pixel value. The calculated difference data between the pictures is output to the time-direction variation information calculation unit 410 as inter-picture difference information.

The time-direction variation information calculation unit 410 calculates time-direction variation information of each region of the feature from the inter-picture difference information and the feature extraction parameter. In order to do so, first, in the processing target picture, a value to be incremented in a region corresponding to a moving object is calculated. This is achieved by obtaining a product of a difference value between the processing target picture and the previous picture, and a difference value between the processing target picture and the next picture.

Figure 3:
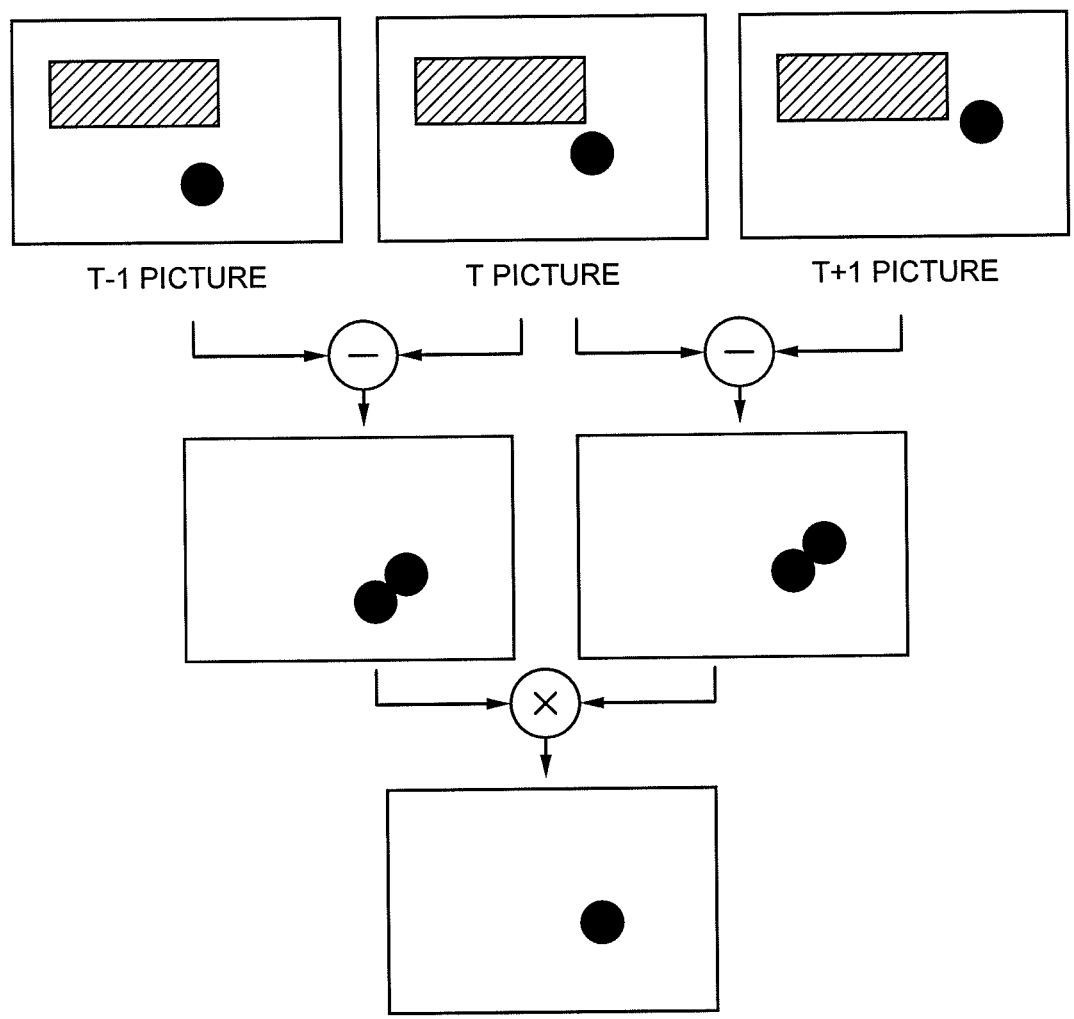
FIG. 3 illustrates a process performed by the time-direction variation information extraction unit 150 in FIG. 2.

This is shown in FIG. 3. In FIG. 3, a T picture represents a processing target picture, a T−1 picture represents the previous picture, and a T+1 picture represents the next picture. In these pictures, it is assumed that a rectangle shaded object remains stationary, and only a round black object moves. In this case, the inter-picture difference calculation unit 400 has calculated a difference between the processing target T picture and the previous T−1 picture. In this case, a difference is only generated by the movement of the round object, as shown in FIG. 3. However, the difference value itself tends to become larger at both location of the round object in the T picture and location of the object in the T−1 picture. Similarly, a difference between the next T+1 picture and the T picture becomes larger at both location of the round object in the T picture and location of the round object in the T+1 picture. Then, a product of both difference images is calculated. Because it is only the position of the round object in the T picture where the difference value becomes larger in both difference images, it is possible to increase only the difference in the moving object region in the T picture. Although a method of calculation using the previous and next pictures of the processing target picture has been described in this embodiment, calculation can also be performed in the same manner using pictures of a few pictures before and a few pictures after. As such, it is possible to increase only the difference in the moving object region in the same manner using a T−m picture and a T+n picture. By collecting the results obtained in this way in the region used for feature extraction of each dimension, the time-direction variation amount in the region is calculated.

As a collecting method, if the results are simply added within the region, the time-direction variation amount is calculated according to the following Expression 1.

$$D(i) = \sum_{x \in R(i)} |f_{T-1}(x) - f_T(x)||f_{T+1}(x) - f_T(x)| \quad \text{[Expression 1]}$$

In Expression 1, $f_T(x)$ represents a pixel value at a position x of the T picture, $R(i)$ represents a region used for calculation of the $i^{th}$ dimension (set of pixels), and $D(i)$ represents the time-direction variation amount in the $i^{th}$ dimension. Although simple addition within a region is used in this embodiment, it is also possible to calculate the time-direction variation amount by obtaining an average within a region, using a square for addition, or using another statistic such as a median or a maximum value. Further, it is also possible to calculate the time-direction variation amount by not using the values of all pixels in a region. For example, the time-direction variation amount can be calculated by using every other pixel.

The information describing the time-direction variation amount with respect to each dimension calculated in this manner is output as time-direction variation information. This may be the variation amount $D(i)$ itself. It is also possible to quantize it into some levels and output a quantization index thereof as time-direction variation information. Further, the time-direction variation information is not necessary calculated for all pictures, and may be calculated for every several pictures. In that case, it is possible to calculate the average of the time-direction variation amounts calculated in multiple frames and use the calculated average value as time-direction variation information corresponding to the several pictures.

As the time-direction variation information extraction unit 150 shown in FIG. 2 is only necessary to obtain a difference between pictures basically, a processing load can be suppressed.

Next, another exemplary configuration of the time-direction variation information extraction unit 150 will be described with reference to FIG. 4.

Figure 4:
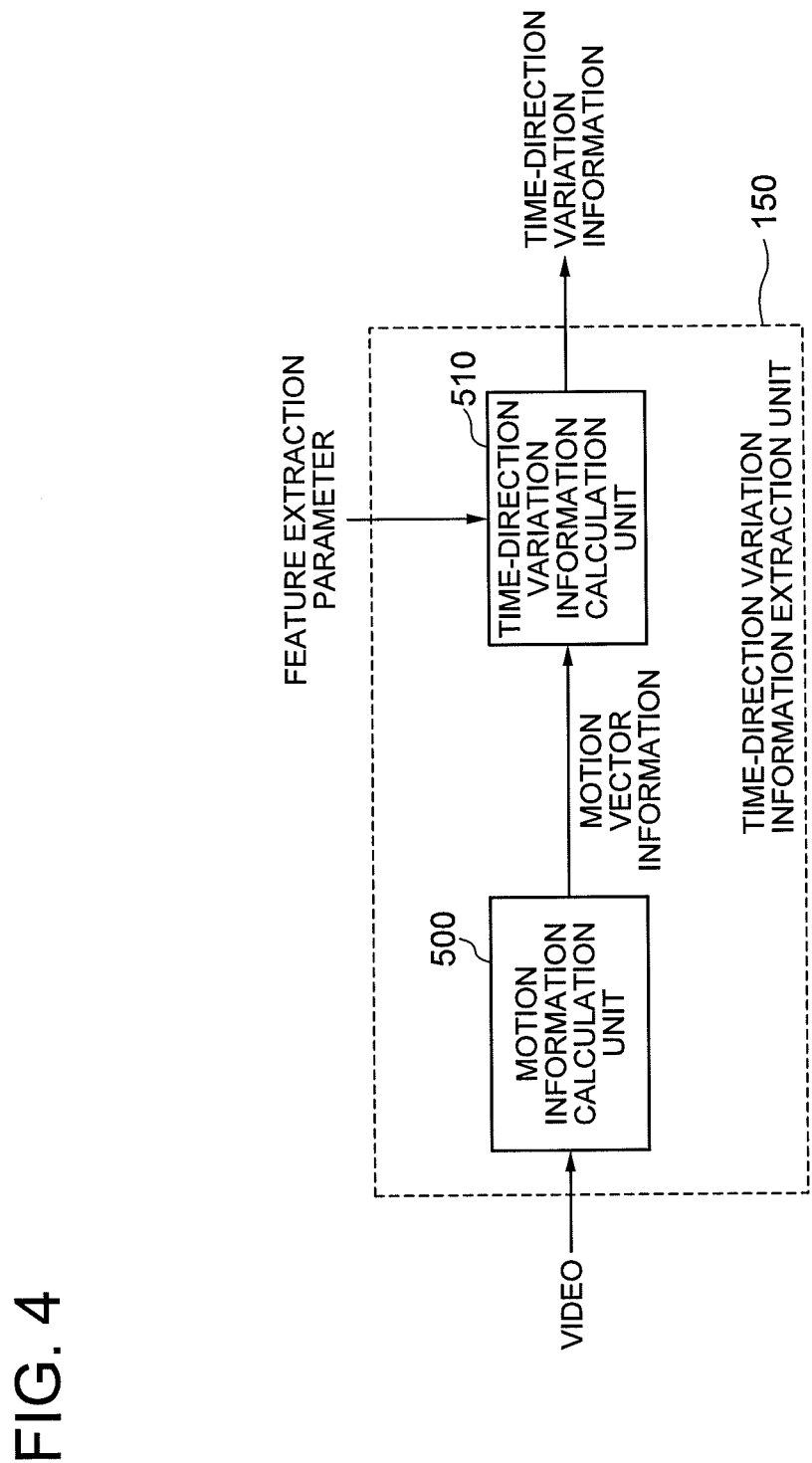
FIG. 4 is a block diagram showing another exemplary configuration of the time-direction variation information extraction unit 150.

Referring to FIG. 4 showing another exemplary configuration of the time-direction variation information extraction unit 150, the time-direction variation information extraction unit 150 includes a motion information calculation unit 500 and a time-direction variation information calculation unit 510.

The motion information calculation unit 500 receives a video, calculates a motion vector, and outputs motion vector information to the time-direction variation information calculation unit 510. The time-direction variation information calculation unit 510 calculates time-direction variation information using the motion vector information output from the motion information calculation unit 500 and a feature extraction parameter, and outputs it.

Next, operation of the time-direction variation information extraction unit 150 shown in FIG. 4 will be described.

First, a video is input to the motion information calculation unit 500. The motion information calculation unit 500 performs motion estimation between the current target picture and the previous (or next) picture to calculate a motion vector. As a method of calculating a motion vector, any motion vector estimation methods including a method based on a conventional gradient method and a method based on a block matching method may be used. Further, motion may be calculated in pixel units, or it is also possible to divide an image into a plurality of small blocks and motion may be calculated for the block units. Information describing the location of the motion vector calculated in this manner is output as motion vector information. The motion vector information may be information directly describing each motion vector calculated within the picture, or information describing motion only in a region where a motion vector other than 0 is calculated, together with information specifying the region. The calculated motion vector information is output to the time-direction variation information calculation unit 510.

Figure 5:
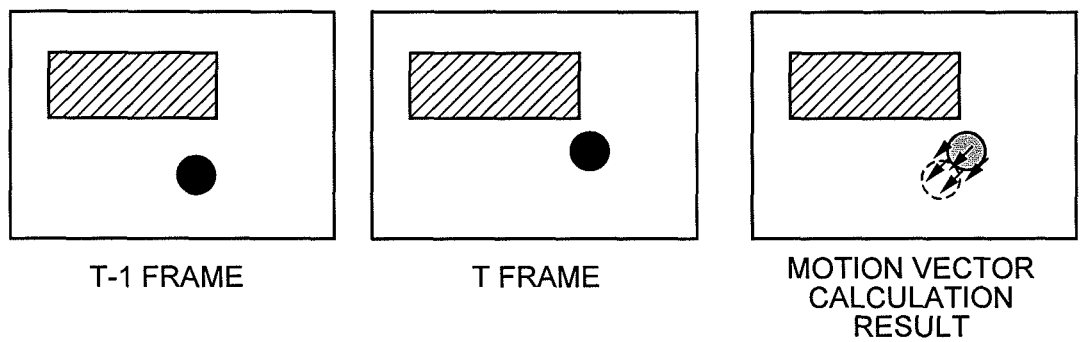
FIG. 5 illustrates a process performed by the time-direction variation information extraction unit 150 in FIG. 4.

The time-direction variation information calculation unit 510 collects the calculated motion vectors according to the feature extraction parameter indicating the region used for calculation of the feature of each dimension, and calculates the time-direction variation amount. This is shown in FIG. 5. FIG. 5 shows the states of the T picture and the T−1 picture. By performing motion estimation processing on these pictures, a motion vector is calculated in a portion corresponding to the motion of the round object, as shown in FIG. 5. Accordingly, the region corresponding to each dimension is obtained from the feature extraction parameter, to thereby calculate the amount of motion within the region. For example, the sum of the lengths of the motion vectors is calculated within the region, which is represented by Expression 2.

$$D(i) = \sum_{x \in R(i)} |v(x)| \qquad \text{[Expression 2]}$$

In Expression 2, v(x) represents a motion vector at a position x. The other signs are the same as those used in Expression 1. Although simple addition in a region is used in this embodiment, it is also possible to obtain the time-direction variation amount by obtaining an average within a region, using a square for addition, or using another statistic such as a median or a maximum value. Further, it is also possible to calculate the time-direction variation amount by not using all of the motion vectors in a region. For example, the time-direction variation amount can be calculated by thinning appropriately.

As the time-direction variation information extraction unit 150 shown in FIG. 4 calculates motion, the amount of processing increases in general, compared with the case of FIG. 2. However, as actual motion is calculated, a region having motion in a time direction can be obtained with higher accuracy, compared with the case of FIG. 2.

This is the description of the matching weight information extraction device according to the first embodiment of the present invention.

Advantageous Effect of First Embodiment of the Present Invention

According to the present embodiment, it is possible to improve the discrimination accuracy in a time direction even in the scenes having less temporal change. This is because even in the scenes having less temporal changes, by increasing the weight of the feature corresponding to a region where an image change such as motion or a luminance change is caused, matching is less affected by a feature change due to coding distortion or the like. For example, it is assumed that a scene in which an anchor person reads the news in a studio consists of two pictures A and B, and that a difference between the pictures A and B is only the mouth of the anchor person and the others are completely the same. When a picture C, which is completely the same as the picture A, is given and it is mechanically determined to which of the pictures A and B the picture C is similar, if there is no coding distortion in the pictures A to C, a distance between the picture C and the picture A is zero. On the other hand, regarding a distance between the picture C and the picture B, as a weight of a mouth portion with motion is large, the distance is sufficiently large.

Now, considering the case where coding distortion exists in the background part of the picture A, for example, although the distance between the picture C and the picture A is large due to the coding distortion, as the weight of the background part with no motion is small, the distance between the picture C and the picture A will never be larger than the distance between the picture C and the picture B.

Further, in the present embodiment, as matching weight information is calculated for one picture among a plurality of continuous pictures and the calculated matching weight information is used as matching weight information of the plurality of pictures, it is possible to reduce the amount of calculation when calculating the matching weight information, and also reduce the amount of information of the matching weight information.

Further, in the present embodiment, as matching weight information for each picture is calculated for all or part of a plurality of continuous pictures and a representative value of the calculated matching weight information for each picture is used as matching weight information of the plurality of pictures, it is possible to reduce the amount of information of the matching weight information.

Further, in the present embodiment, as time segments to which identical matching weight information is applicable are determined based on the degree of image change in a time direction of the pictures and then matching weight information for the pictures within the time segments are determined, it is possible to reduce the amount of information of the matching weight information while maintaining high discrimination accuracy in a time direction regardless of the processing target videos.

Further, in the present embodiment, as a difference between pixel values of the pictures is calculated by obtaining a difference between representative values of the pixel values of the regions at the same location on the pictures, it is possible to prevent an influence of noise superimposed on the videos.

Next, a video signature extraction device using the first embodiment of the present invention, and a device for performing matching between video signatures generated by such an extraction device, will be described.

Figure 6:
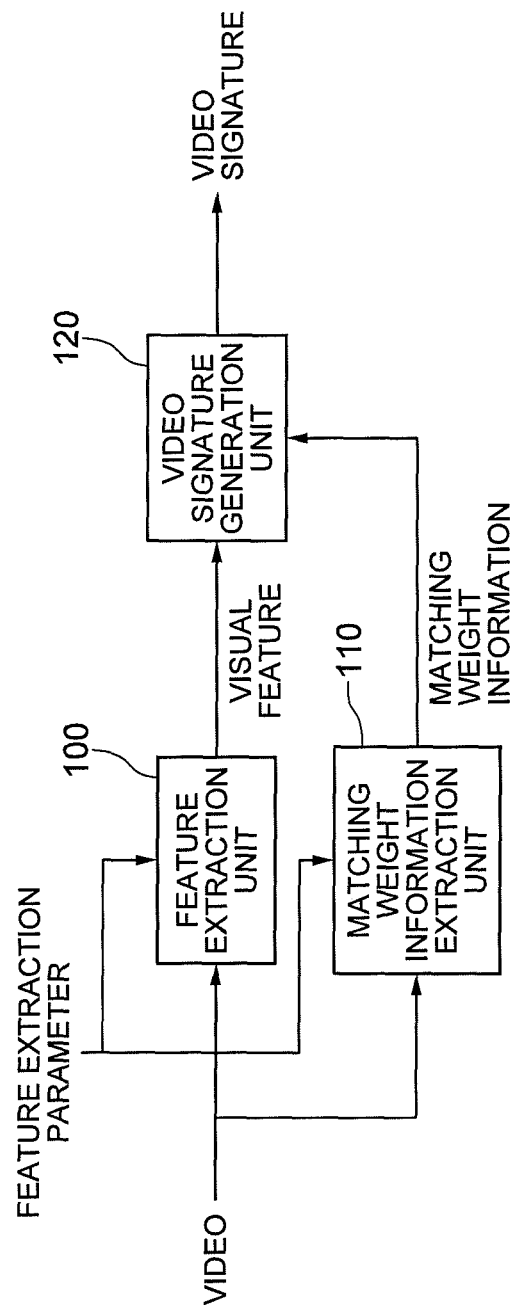
FIG. 6 is a block diagram showing an embodiment of a video signature extraction device in which the matching weight information extraction device incorporating the first embodiment of the present invention.

Referring to FIG. 6 showing a video signature extraction device using the matching weight information extraction device according to the first embodiment of the present invention, the video signature extraction device includes a feature extraction unit 100, a matching weight information extraction unit 110, and a video signature generation unit 120. It should be noted that the video signature extraction device shown in FIG. 6 can be realized by a computer controlled by a program.

The feature extraction unit 100 extracts a visual feature from an input video using an input feature extraction parameter, and outputs the visual feature to the video signature generation unit 120. The matching weight information extraction unit 110 calculates matching weight information from the input video using the input feature extraction parameter, and outputs the matching weight information to the video signature generation unit 120. The video signature generation unit 120 combines the visual feature output from the feature extraction unit 100 and the matching weight information output from the matching weight information extraction unit 110 to generate a video signature, and outputs it.

Next, operation of the video signature extraction device shown in FIG. 6 will be described in detail.

First, a video is input to the feature extraction unit 100. If the original video is encoded, the video is first decoded by a decoder, and then the data is input in picture units composed of frames or fields.

The feature extraction unit 100 calculates a feature vector of each picture. The feature extraction unit 100 considers a picture as one still image, and extracts a vector of visual features indicating features such as colors, patterns, shapes, and the like of this picture. In this embodiment, a visual feature is determined to be a feature calculated from sub-regions in the screen image, rather than one obtained by converting the entire screen image. As such, each dimension of the feature vector is associated with a particular region in the screen image by a feature extraction parameter, and the value of the feature extracted from such a region is stored. For example, each dimension of the feature vector is determined to have a feature extracted from each block formed by dividing the screen image into blocks. The feature vector, calculated for each picture, is output to the video signature generation unit 120 as a visual feature.

Further, the video is also input to the matching weight information extraction unit 110. Operation of the matching weight information extraction unit 110 has been described in the first embodiment of the present invention, and the calculated matching weight information is output to the video signature generation unit 120.

The video signature generation unit 120 combines the visual feature output from the feature extraction unit 100 and the matching weight information output from the matching weight information extraction unit 110 to generate a video signature, and outputs it. In this embodiment, the video signature is generated by multiplexing the visual feature and the matching weight information in such a manner that both are separable when performing matching. As multiplexing methods, it is possible to multiplex them by interleaving the visual feature and the matching weight information for each picture, multiplex pieces of matching weight information first and then multiplex the visual features (or opposite), or multiplex the matching weight information and the visual feature for each given section (by a time segment unit for calculating matching weight information).

Next, an embodiment of a matching device for video signatures generated by the video signature extraction device shown in FIG. 6 will be described.

Figure 7:
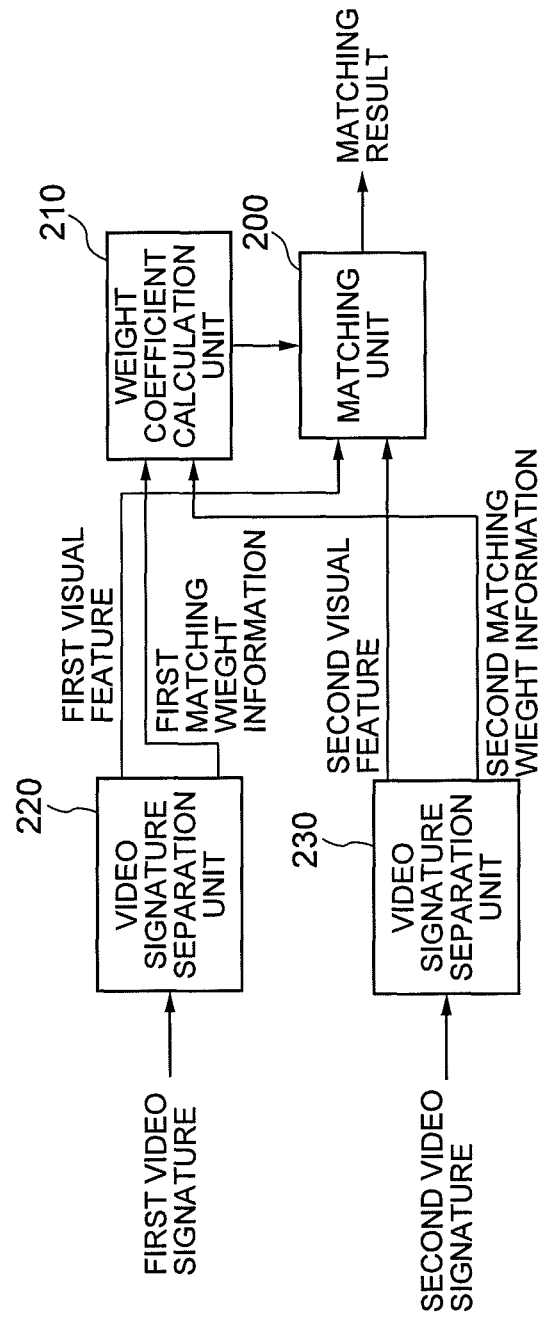
FIG. 7 is a block diagram showing an embodiment of a video signature matching device for performing matching on video signatures output from the video signature extraction device in FIG. 6.

Referring to FIG. 7 showing an embodiment of a video signature matching device for performing matching on video signatures generated by the video signature extraction device shown in FIG. 6, the video signature matching device includes a video signature separation unit 220, a video signature separation unit 230, a weight coefficient calculation unit 210, and a matching unit 200. It should be noted that the video signature matching device shown in FIG. 7 can be realized by a computer controlled by a program.

The video signature separation unit 220 separates a first visual feature and first matching weight information from an input first video signature, and respectively outputs to the matching unit 200 and to the weight coefficient calculation unit 210. Similarly, the video signature separation unit 230 separates a second visual feature and second matching weight information from an input second video signature, and respectively outputs to the matching unit 200 and to the weight coefficient calculation unit 210. The weight coefficient calculation unit 210 calculates a weighting coefficient (which may also be referred to as a weight coefficient) from the first matching weight information output from the video signature separation unit 220 and the second matching weight information output from the video signature separation unit 230, and outputs it to the matching unit 200. The matching unit 200 performs matching between the first visual feature output from the video signature separation unit 220 and the second visual feature output from the video signature separation unit 230 using the weighting coefficient output from the weight coefficient calculation unit 210, and outputs a matching result.

Next, operation of the image signature matching device shown in FIG. 7 will be described.

First, the first video signature is input to the video signature separation unit 220. The video signature separation unit 220 separates the first visual feature and the first matching weight information from the first video signature. At this time, separation is performed by a separation method corresponding to the method used for multiplexing performed by the video signature generation unit 120. The first visual feature, generated by separation, is output to the matching unit 200, and the first matching weight information is output to the weight coefficient calculation unit 210.

The second video signature is input to the video signature separation unit 230. Operation of the video signature separation unit 230 is similar to that of the video signature separation unit 220. The second video signature, generated by separation, is output to the matching unit 200, and the second matching weight information is output to the weight coefficient calculation unit 210.

The weight coefficient calculation unit 210 calculates a weight coefficient for each dimension of the feature, from the first matching weight information and the second matching weight information. A plurality of methods may be used for calculating a weight coefficient from the first matching weight information and the second matching weight information, if the calculated weight coefficient satisfies conditions such that it becomes smaller when both pieces of matching weight information correspond to a smaller weight value and that it increases when at least one of weight values corresponding to the matching weight information increases. For example, if respective weights calculated from the first matching weight information and the second matching weight information are $w_1(i)$ and $w_2(i)$, a weight coefficient $w(i)$ is calculated from the following Expression 3.

$$w(i) = \max(w_1(i), w_2(i)) \qquad \text{[Expression 3]}$$

More generally, the following Expression 4 may be used.

$$w(i) = |w_1(i)^p + w_2(i)^p|^{1/p} \qquad \text{[Expression 4]}$$

In Expression 4, p represents any natural number, and when p is infinite, the expression results in Expression 3. This weight coefficient is calculated for each dimension of the feature, and is output to the matching unit 200.

The matching unit 200 performs matching between the first visual feature and the second visual feature. They may be performed by comparison using a similarity value indicating the similarity between the two features, or using a distance indicating the level of difference between the two features. In the case of comparing them using a distance, comparison will be performed based on a distance d calculated from Expression 5.

$$d = \sum_{i=1}^{N} w(i)|v_1(i) - v_2(i)| \qquad \text{[Expression 5]}$$

It should be noted that N represents the number of dimensions of the feature, and $v_1(i)$ and $v_2(i)$ respectively represent values of the $i^{th}$ dimension of the first and second visual features, and w(i) represents a weight coefficient corresponding to the $i^{th}$ dimension. By performing comparison in picture units, matching is performed between specific segments of the first video and the second video. For example, a number of pairs of pictures having distance values not more that a threshold is obtained in a comparison in picture units, and if the value is sufficiently large relative to the number of pictures included in the segments, the both videos are determined to be of the same segment, while if not, they are determined not to be of the same segment. By performing this process on combinations in arbitrary segments of the first video and the second video, all of the same segments of any lengths included in those videos can be determined. Instead of performing threshold processing on distances in picture units, it is also possible to perform determination according to whether or not a value obtained by summing the distances within the segment is smaller than a predetermined threshold. Of course, an average value may be obtained, rather than the total value. It is also possible to perform matching within segments while eliminating outlier. Such matching may be performed using a median or a result of M-estimation, instead of an average value, for example.

Figure 8:
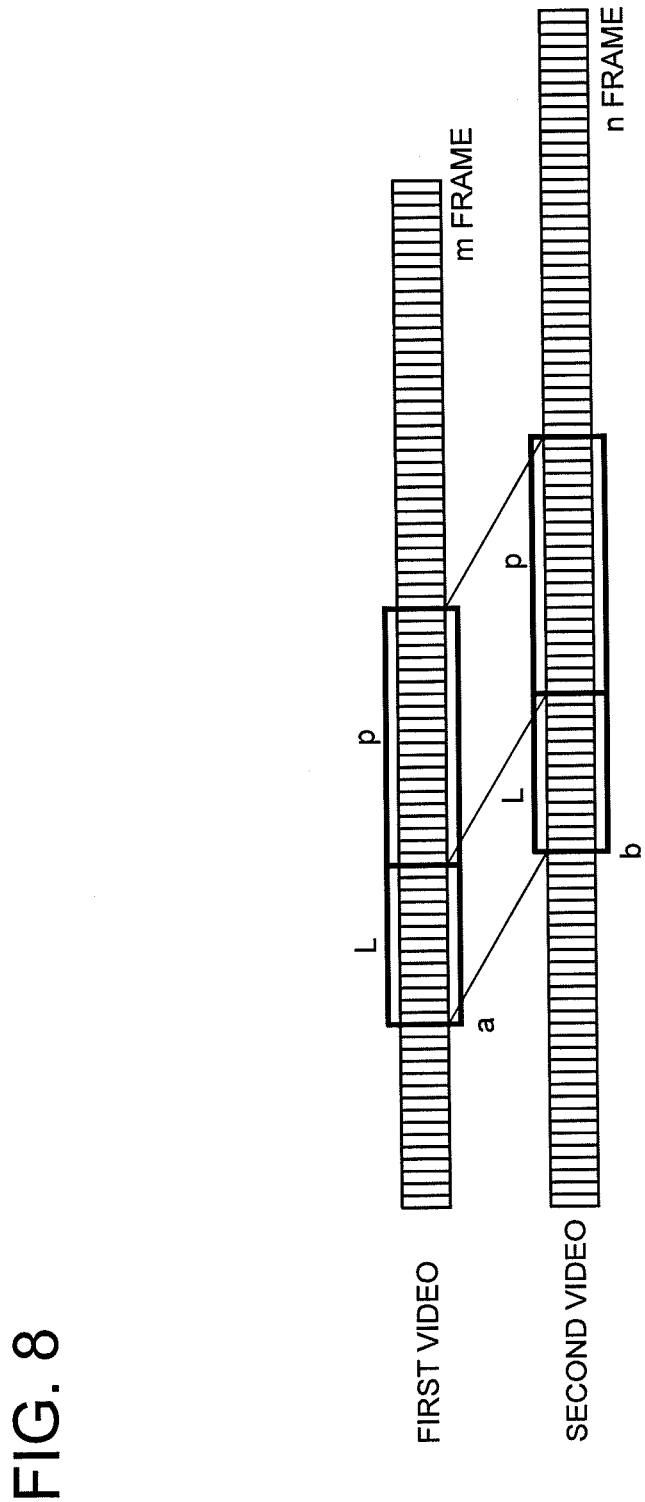
FIG. 8 illustrates a matching process performed between two videos.

As a method for comparing segments of any length, the matching method described in Non-Patent Document 2 can also be used. As shown in FIG. 8, for performing matching between videos, a matching window having a length of L pictures is provided, and the window is caused to slide on the first video and the second video respectively, and they are compared with each other. If the segments within the matching window are determined to be identical, the matching window is extended by a length of p pictures to continue the matching process. As long as both segments are determined to be identical, the process of extending the matching window by p pictures is repeated so as to obtain the identical segments of a maximum length. Thereby, the identical segments having a maximum length can be acquired effectively.

It should be noted that although the case of using a distance as a criterion has been described above, matching can also be performed using a similarity value. In that case, comparison is specifically performed using a similarity value S calculated by Expression 6.

$$S = \sum_{i=1}^{N} w(i) Sim(v_1(i), v_2(i))$$ [Expression 6]

In this expression, Sim(x, y) is a function showing closeness between x and y, and the value becomes larger as the values of x and y are closer. For example, if the distance between x and y is d(x, y), a function shown as Expression 7 can be used.

$$Sim(x, y) = \frac{1}{1 + d(x, y)}$$ [Expression 7]

Alternatively, Sim(x, y) may be a function that returns 1 when x and y match, and returns 0 otherwise, as Kronecker delta. Alternatively, if an angle (cosine value) between feature vectors is used as a similarity value, comparison is performed based on a similarity value S calculated by Expression 8.

$$S = \frac{\sum_{i=1}^{N} w(i) v_1(i) v_2(i)}{\sqrt{\left(\sum_{i=1}^{N} w(i) v_1(i)^2\right)\left(\sum_{i=1}^{N} w(i) v_2(i)^2\right)}}$$ [Expression 8]

By using the similarity value acquired as described above, matching can be performed in a similar manner to that of the case of distance. Thereby, a matching result between the first video signature and the second video signature is calculated.

This is the description of the video signature extraction device using the first embodiment of the present invention, and the matching device for video signatures generated by such an extraction device.

Next, a second embodiment of a matching weight information extraction device of the present invention will be described.

Figure 9:
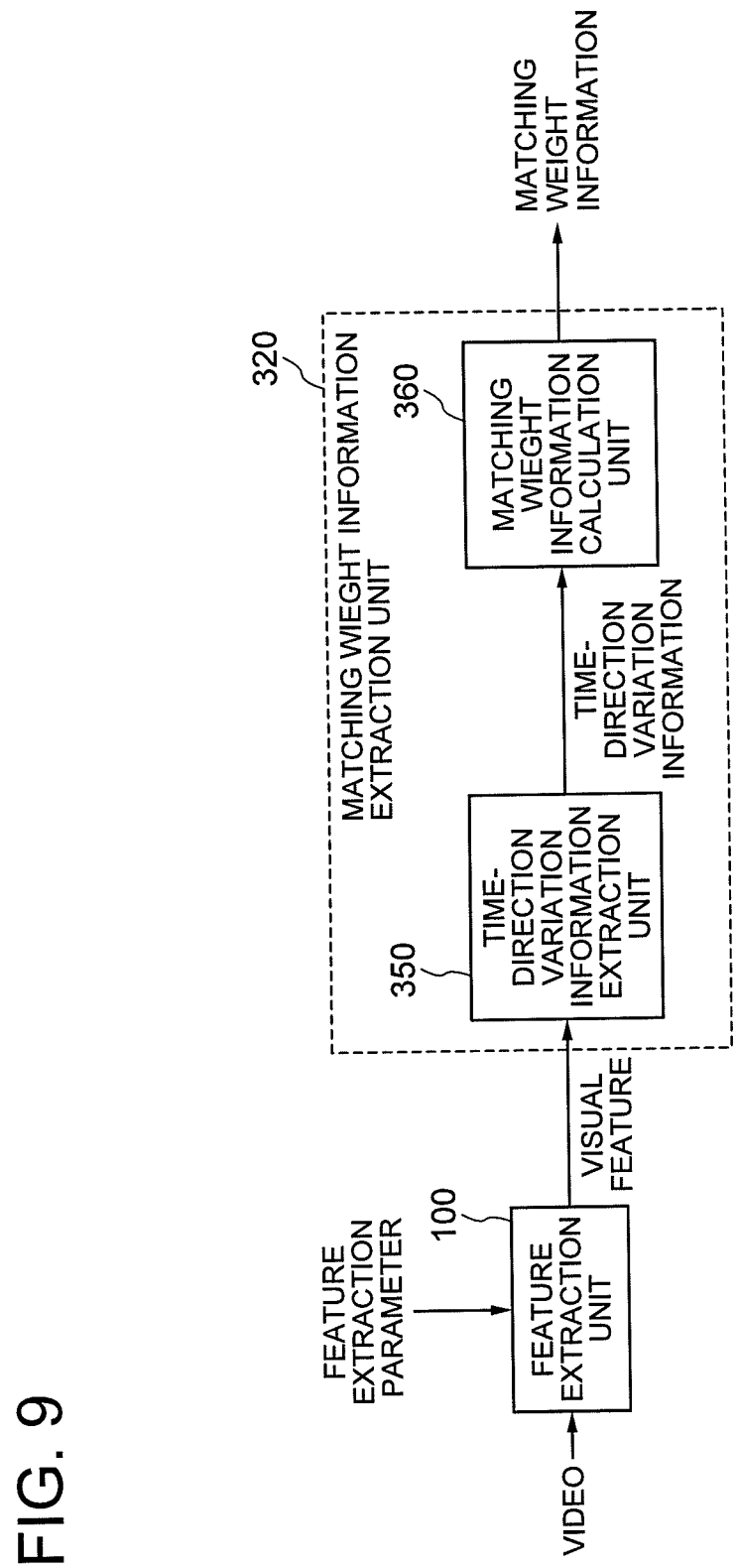
FIG. 9 is a block diagram showing a second embodiment of a matching weight information extraction device according to the present invention.

Referring to FIG. 9 showing the matching weight information extraction device according to the second embodiment of the present invention, the matching weight information extraction device includes a feature extraction unit 100 and a matching weight information extraction unit 320. The matching weight information extraction unit 320 includes a time-direction variation information extraction unit 350 and a matching weight information calculation unit 360. It should be noted that the matching weight information extraction device shown in FIG. 9 can be realized by a computer controlled by a program.

The feature extraction unit 100 extracts a visual feature from an input video using an input feature extraction parameter, and outputs it to the time-direction variation information extraction unit 350. The time-direction variation information extraction unit 350 obtains time-direction variation information based on the visual feature output from the feature extraction unit 100, and outputs it to the matching weight information calculation unit 360. The matching weight information calculation unit 360 obtains matching weight information from the time-direction variation information output from the time-direction variation information extraction unit 350, and outputs it.

Next, operation of the matching weight information extraction device shown in FIG. 9 will be described.

Operation of the feature extraction unit 100 is similar to that of the feature extraction unit 100 of the video signature extraction device shown in FIG. 6, and the obtained visual feature is output to the time-direction variation information extraction unit 350.

The time-direction variation information extraction unit 350 analyzes how the values of respective dimensions of the visual features, input in a time-series manner, change in a time direction, and outputs the obtained result to the matching weight information calculation unit 360 as time-direction variation information. For example, a variance value is calculated with respect to each dimension of the feature within a given time segment. As a larger variance indicates a larger variation in a time direction, time-direction variation information is calculated based on the variance. For example, it is possible to directly use a variance value or a value of a feature derived from a variance value (e.g., standard deviation) as a time-direction variation amount.

Operation of the matching weight information calculation unit 360 is basically similar to that of the matching weight information calculation unit 160 shown in FIG. 1. The difference is that whether an input value of time-direction variation information is calculated from the original video or calculated based on the feature calculated from the video. Based on the time-direction variation information, a weight is calculated such that contribution of a dimension, in which the value changes, becomes high and contribution of a dimension, in which the value does not change, becomes low.

Advantageous Effect of Second Embodiment of the Present Invention

According to the present embodiment, even in the case where a distortion is caused in a video due to encoding distortion in a scene having less changes temporally, it is possible to improve discrimination accuracy in a time direction and detect a similar or identical video segment with high accuracy. This is because as matching weight information for each dimension of the feature is allowed to correspond to a degree of change in a time direction of the value of each dimension of the feature, it is possible to reduce an influence of feature changes caused by encoding distortion or the like on the matching.

Next, an embodiment of a video signature matching device using the matching weight information extraction unit 320 according to the second embodiment of the present invention will be described.

Figure 10:
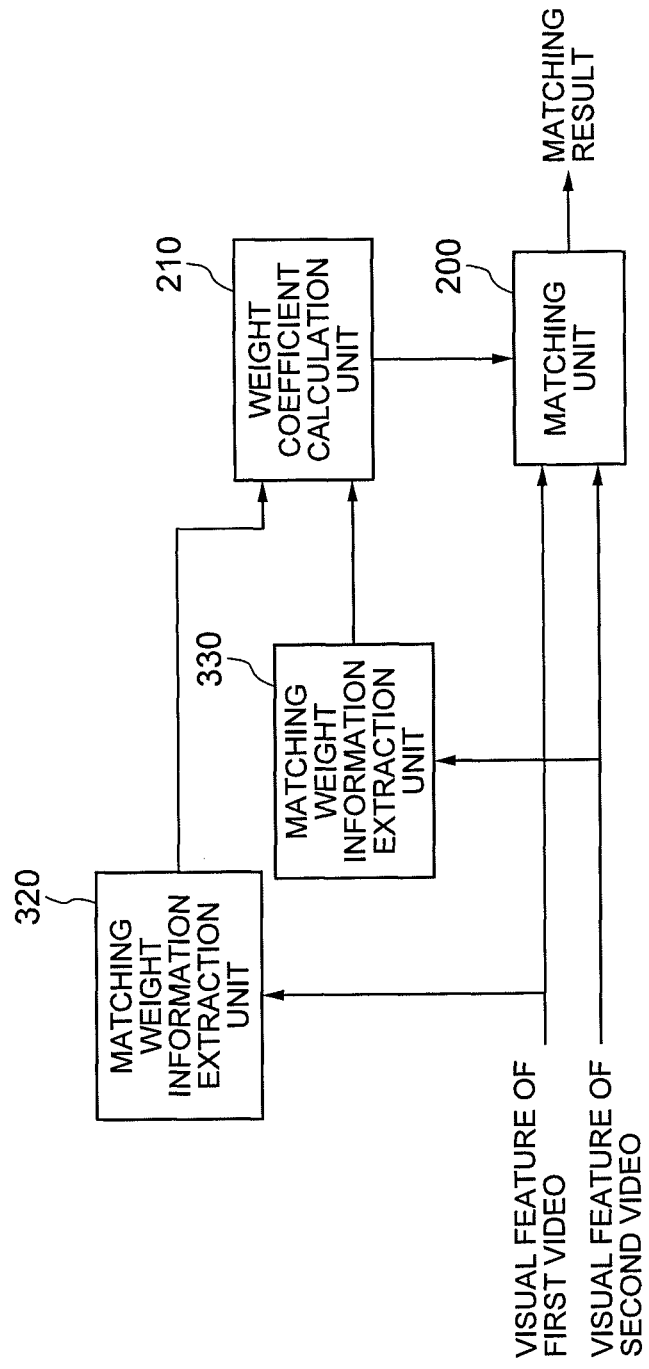
FIG. 10 is a block diagram showing an embodiment of a video signature matching device incorporating the matching weight information extraction device of the second embodiment.

Referring to FIG. 10 showing an embodiment of a video signature matching device using the matching weight information extraction unit 320 according to the second embodiment of the present invention, the video signature matching device includes matching weight information extraction units 320 and 330, a weight coefficient calculation unit 210, and a matching unit 200. It should be noted that the video signature matching device shown in FIG. 10 can be realized by a computer controlled by a program.

The matching weight information extraction units 320 and 330 respectively receive a first visual feature and a second visual feature, and respectively output first matching weight information and second matching weight information to the weight coefficient calculation unit 210. The weight coefficient calculation unit 210 calculates a weight coefficient corresponding to each dimension of the feature based on the first matching weight information and the second matching weight information output from the matching weight information extraction units 320 and 330, and outputs it to the matching unit 200. The matching unit 200 performs matching between the first visual feature and the second visual feature using the weight coefficient output from the weight coefficient calculation unit 210, and outputs a matching result.

Next, operation of the video signature matching device shown in FIG. 10 will be described.

The first visual feature and the second visual feature are respectively input to the matching weight information extraction units 320 and 330. Operation of the matching weight information extraction units 320 and 330 is the same as that of the matching weight information extraction unit 320 shown in FIG. 9, and the respective units calculate the first matching weight information and the second matching weight information. The calculated first matching weight information and second matching weight information are output to the weight coefficient calculation unit 210.

Operation of the weight coefficient calculation unit 210 is the same as that of the weight coefficient calculation unit 210 of the matching device shown in FIG. 7, and the calculated weight coefficient is output to the matching unit 200.

Operation of the matching unit 200 is the same as that of the matching unit 200 shown in FIG. 7, and the matching unit 200 outputs a matching result.

This is the description of the embodiment of the video signature matching device shown in FIG. 10. With the present embodiment, it is possible to calculate a weight coefficient on the matching side, without calculating matching weight information for matching when performing extraction, and use it for matching, and use it for matching.

Next, a third embodiment of the present invention will be described.

Figure 11:
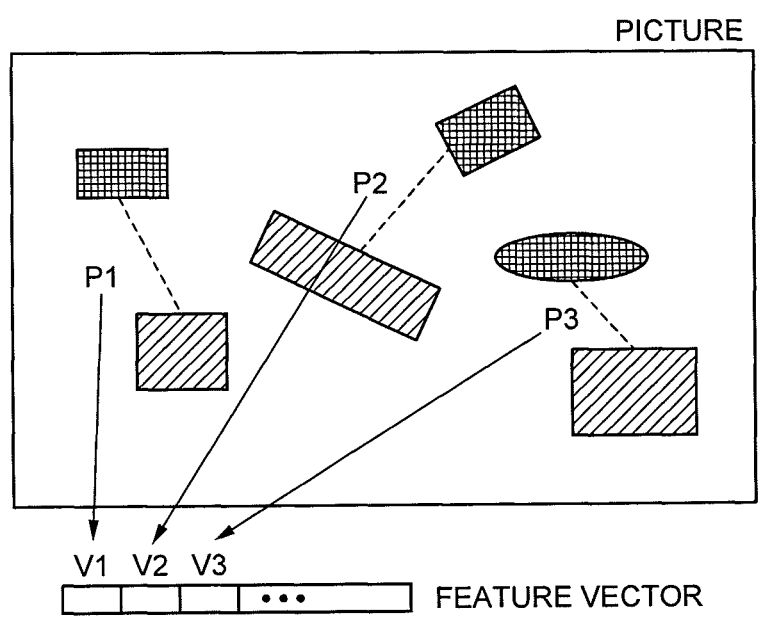
FIG. 11 illustrates examples of features.
Figure 12:
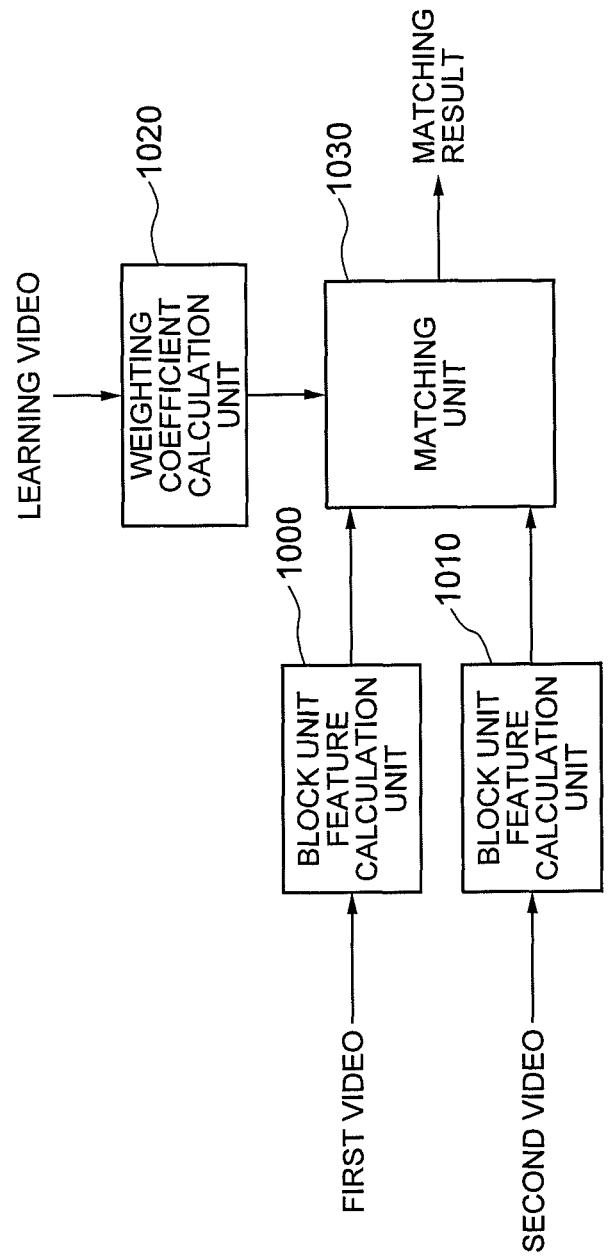
FIG. 12 is a block diagram for illustrating related art of the present invention.

FIG. 11 shows an exemplary method for extracting features from a picture. In this method, pairs of any two regions within a picture are set beforehand, and a difference between the features of the two regions of a pair is obtained as a feature vector. In this embodiment, respective pairs of regions are indicated as P1, P2, P3, . . . , and a feature determined from the $n^{th}$ pair is indicated as Vn. Pairs of regions may take various combinations of shapes and positions of regions, as shown in FIG. 11. Also, various methods can be used for calculating the feature Vn from the pair Pn. For example, there is a method in which an average luminance is calculated in each of a shaded region and a reticulated region of a pair, and a value of the feature Vn is determined from the magnitude relation thereof. Specifically, an average luminance obtained in the reticulated region is subtracted from an average luminance obtained in the shaded region to calculate a difference, and if the difference is positive, Vn=1, while if the difference is negative, Vn=−1. It is also possible that if the absolute value of the difference is smaller than a threshold, Vn is zero, so that the feature Vn is indicated by a ternary value.

When this feature is used, the feature extraction parameter of the feature of the $n^{th}$ dimension is information describing the region pair Pn. Specifically, information defining the shapes, positions, and size of the region pair is used as the feature extraction parameter.

The time-direction variation information extraction unit 150 calculates time-direction variation information of the region pair Pn defined by the feature extraction parameter. For example, in the case of a region pair P1, the time-direction variation information extraction unit 150 extracts a time-direction variation amount within the two rectangle regions including in the region pair P1 shown in FIG. 11. This means that among time-direction variation amounts calculated according to FIG. 3 and motion amounts calculated according to FIG. 5, a value within the regions corresponding to the region pair P1 is calculated, and is used as time-direction variation information of the feature of the $1^{st}$ dimension.

Based on the result of calculating the time-direction variation information for each dimension in this manner, the matching weight information calculation unit 160 calculates matching weight information for each dimension. For this calculation, the above-described method can be used. For example, a weight w(i) is determined according to Expression 9 in accordance with the time-direction variation amount D(i) of the $i^{th}$ dimension indicated by the time-direction variation information. In this expression, g(x) represents a function which increases monotonically.

$$w(i)=g(D(i)) \hspace{2cm} \text{[Expression 9]}$$

While the embodiments of the present invention have been described above, the present invention is not limited to these examples. It will be understood by those of ordinary skill in the art that various changes may be made therein without departing from the scope of the present invention.

This application is based upon and claims the benefit of priority from Japanese patent application No. 2009-12814, filed on Jan. 23, 2009, the disclosure of which is incorporated herein in its entirety by reference.

INDUSTRIAL APPLICABILITY

The present invention is applicable to retrieval of similar or identical videos from various videos with high accuracy. In particular, regarding retrieval of the same segments of videos, the present invention is applicable to identification of illegally copied moving images distributed on the networks and identification of commercials distributed on actual airwaves.

The invention claimed is:

1. A matching weight information extraction device, comprising
   a matching weight information extraction unit that analyzes a change in a time direction of at least either an input video or features of a plurality of dimensions extracted from the video, in association with the dimensions, and calculates weight information which takes a larger weight value for a dimension having a larger degree of a change in a time direction, to be used for matching for each of the dimensions as matching weight information, according to a degree of the change in the time direction.

2. The matching weight information extraction device, according to claim 1, wherein
   the matching weight information extraction unit analyzes an image change in a time direction within a region associated with each dimension of the features of the plurality of dimensions with respect to a picture which is a frame or a field of the input video, and calculates the matching weight information according to the image change.

3. The matching weight information extraction device, according to claim 1, wherein
the matching weight information extraction unit analyzes a change in a time dimension of a value of each of the dimensions from the features of the plurality of dimensions, and calculates the matching weight information according to the change of the value.

4. The matching weight information extraction device, according to claim 2, wherein
analysis of the image change in the time direction includes calculating an inter-picture pixel value difference between the picture for which the matching weight information is calculated and a previous or next picture, and calculating the image change corresponding to each of the dimensions of the features based on the calculated inter-picture pixel value difference.

5. The matching weight information extraction device, according to claim 2, wherein
analysis of the image change in the time direction includes performing motion estimation processing between the picture for which the matching weight information is calculated and a previous or next picture, and calculating the image change corresponding to each of the dimensions of the features based on a degree of magnitude of an estimated motion.

6. The matching weight information extraction device, according to claim 2, wherein
the matching weight information extraction unit calculates matching weight information for one picture among a plurality of continuous pictures, and uses the calculated matching weight information as matching weight information of the plurality of pictures.

7. The matching weight information extraction device, according to claim 2, wherein
the matching weight information extraction unit calculates matching weight information for each picture with respect to all or part of a plurality of continuous pictures, and uses a representative value of the calculated matching weight information for each picture as matching weight information of the plurality of pictures.

8. The matching weight information extraction device, according to claim 2, wherein
the matching weight information extraction unit determines a time segment to which identical matching weight information is applicable based on a degree of an image change in a time direction of pictures, and uses matching weight information of any one picture among pictures in the time segment or a representative value of matching weight information of the pictures in the time segment as matching weight information of the pictures in the time segment.

9. The matching weight information extraction device, according to claim 4, wherein
the inter-picture pixel value difference is a difference between representative values of pixel values of regions located at a same position in the pictures.

10. The matching weight information extraction device, according to claim 1, wherein
each of the dimensions of the features has a value corresponding to a difference between features of two regions in different shapes within a picture, the regions having been set beforehand with respect to the dimension.

11. A video signature extraction device, comprising:
a feature extraction unit that extracts features of a plurality of dimensions from an input video;
a matching weight information extraction unit that analyzes a change in a time direction of the input video in association with the dimensions, and calculates matching weight information for each of the dimensions according to a degree of the change in the time direction; and
a video signature generation unit that generates a video signature by combining the features extracted by the feature extraction unit and the matching weight information extracted by the matching weight information extraction unit.

12. The video signature extraction device, according to claim 11, wherein
the matching weight information extraction unit analyzes an image change in a time direction within a region associated with each dimension of the features of the plurality of dimensions with respect to a picture which is a frame or a field of the input video, and calculates the matching weight information according to a degree of the image change.

13. A video signature matching device, comprising:
a matching weight information acquisition unit that acquires first matching weight information which is matching weight information for each dimension of first features of a plurality of dimensions included in an input first video signature, the first matching weight information corresponding to a degree of a change in a time direction of the dimension, and second matching weight information which is matching weight information for each dimension of second features of a plurality of dimensions included in an input second video signature, the second matching weight information corresponding to a degree of a change in a time direction of the dimension;
a weight coefficient calculation unit that calculates a weighting coefficient corresponding to each of the dimensions of the features from the first matching weight information and the second matching weight information; and
a matching unit that performs matching between the first feature and the second feature while applying a weight using the weighting coefficient to thereby calculate a matching result.

14. The video signature matching device, according to claim 13, wherein
the first video signature includes the first matching weight information in addition to the first features, and the second video signature includes the second matching weight information in addition to the second features, and
the matching weight information acquisition unit includes:
a first video signature separation unit that separates the first features and the first matching weight information from the first video signature; and
a second video signature separation unit that separates the second features and the second matching weight information from the second video signature.

15. The video signature matching device, according to claim 13, wherein the matching weight information acquisition unit includes:
a first matching weight information extraction unit that analyzes a change in a time direction of the first features in association with the dimensions, and calculates weight information to be used for matching for each of the dimensions as the first matching weight information according to a degree of the change in the time direction; and a second matching weight information extraction unit that analyzes a change in a time direction of the second features in association with the dimensions, and calculates weight information to be used for matching for each of the dimensions as the second matching weight information according to a degree of the change in the time direction.

16. A matching weight information extraction method, comprising, analyzing a change in a time direction of at least either an input video or features of a plurality of dimensions extracted from the video, in association with the dimensions, and calculating weight information which takes a larger weight value for a dimension having a larger degree of a change in a time direction, to be used for matching for each of the dimensions as matching weight information, according to a degree of the change in the time direction.

17. The matching weight information extraction method, according to claim 16, further comprising, analyzing an image change in a time direction within a region associated with each dimension of the features of the plurality of dimensions with respect to a picture which is a frame or a field of the input video, and calculating the matching weight information according to the image change.

18. The matching weight information extraction method, according to claim 16, further comprising, analyzing a change in a time direction of a value of each of the dimensions from the features of the plurality of dimensions, and calculating the matching weight information according to the change of the value.

19. The matching weight information extraction method, according to claim 17, wherein the analyzing the image change in the time direction includes calculating an inter-picture pixel value difference between the picture for which the matching weight information is calculated and a previous or next picture, and calculating the image change corresponding to each of the dimensions of the features based on the calculated inter-picture pixel value difference.

20. The matching weight information extraction method, according to claim 17, wherein the analyzing the image change in the time direction includes performing motion estimation processing between the picture for which the matching weight information is calculated and a previous or next picture, and calculating the image change corresponding to each of the dimensions of the features based on a degree of magnitude of an estimated motion.

21. The matching weight information extraction method, according to claim 17, further comprising, calculating matching weight information for one picture among a plurality of continuous pictures, and using the calculated matching weight information as matching weight information of the plurality of pictures.

22. The matching weight information extraction method, according to claim 17, further comprising, calculating matching weight information for each picture with respect to all or part of a plurality of continuous pictures, and using a representative value of the calculated matching weight information for each picture as matching weight information of the plurality of pictures.

23. The matching weight information extraction method, according to claim 17, further comprising, determining a time segment to which identical matching weight information is applicable based on a degree of an image change in a time direction of pictures, and using matching weight information of any one picture among pictures in the time segment or a representative value of matching weight information of the pictures in the time segment as matching weight information of the pictures in the time segment.

24. The matching weight information extraction method, according to claim 19, wherein the inter-picture pixel value difference is a difference between representative values of pixel values of regions located at a same position in the pictures.

25. The matching weight information extraction method, according to claim 16, wherein each of the dimensions of the features has a value corresponding to a difference between features of two regions in different shapes within a picture, the regions having been set beforehand with respect to the dimension.

26. A video signature extraction method, comprising:

extracting features of a plurality of dimensions from an input video;

analyzing a change in a time direction of the input video in association with the dimensions, and calculating matching weight information for each of the dimensions according to a degree of the change in the time direction; and generating a video signature by combining the extracted features and the extracted matching weight information.

27. The video signature extraction method, according to claim 26, wherein the calculating the matching weight information includes analyzing an image change in a time direction within a region associated with each dimension of the features of the plurality of dimensions with respect to a picture which is a frame or a field of the input video, and calculating the matching weight information according to a degree of the image change.

28. A video signature matching method, comprising:

acquiring first matching weight information which is matching weight information for each dimension of first features of a plurality of dimensions included in an input first video signature, the first matching weight information corresponding to a degree of a change in a time direction of the dimension, and second matching weight information which is matching weight information for each dimension of second features of a plurality of dimensions included in an input second video signature, the second matching weight information corresponding to a degree of a change in a time direction of the dimension;

calculating a weighting coefficient corresponding to each of the dimensions of the features from the first matching weight information and the second matching weight information; and performing matching between the first feature and the second feature while applying a weight using the weighting coefficient, and thereby calculating a matching result.

29. The video signature matching method, according to claim 28, wherein the first video signature includes the first matching weight information in addition to the first features, and the second video signature includes the second matching weight information in addition to the second features, and the acquiring the first matching weight information and the second matching weight information includes:
    separating the first features and the first matching weight information from the first video signature; and
    separating the second features and the second matching weight information from the second video signature.

30. The video signature matching method, according to claim 28, wherein
    the acquiring the first matching weight information and the second matching weight information includes:
    analyzing a change in a time direction of the first features in association with the dimensions, and calculating weight information to be used for matching for each of the dimensions as the first matching weight information according to a degree of the change in the time direction; and
    analyzing a change in a time direction of the second features in association with the dimensions, and calculating weight information to be used for matching for each of the dimensions as the second matching weight information according to a degree of the change in the time direction.

31. A non-transitory computer-readable medium storing a program comprising instructions for causing a computer to function as
    a matching weight information extraction unit that analyzes a change in a time direction of at least either an input video or features of a plurality of dimensions extracted from the video, in association with the dimensions, and calculates weight information which takes a larger weight value for a dimension having a larger degree of a change in a time direction, to be used for matching for each of the dimensions as matching weight information, according to a degree of the change in the time direction.

* * * * *